(No Model.)

E. S. LEAYCRAFT.
CRANK AND CRANK AXLE FOR BICYCLES.

No. 582,750. Patented May 18, 1897.

WITNESSES:
D. H. Mayord
L. A. Schaefer

INVENTOR,
Edwin S. Leaycraft,
BY Pierson L. Wells,
HIS ATTORNEY.

United States Patent Office.

EDWIN S. LEAYCRAFT, OF JERSEY CITY, NEW JERSEY.

CRANK AND CRANK-AXLE FOR BICYCLES.

SPECIFICATION forming part of Letters Patent No. 582,750, dated May 18, 1897.

Application filed July 16, 1896. Serial No. 599,366. (No model.)

*To all whom it may concern:*

Be it known that I, EDWIN S. LEAYCRAFT, of Jersey City, New Jersey, have invented certain new and useful Improvements in Cranks and Crank-Axles for Bicycles, of which the following is a specification.

The present invention relates more particularly to means for securing the pedal-crank of a bicycle to the crank-axle.

I will describe a crank and crank-axle embodying the features of my improvement and then define the novelty thereof in a claim.

Figure 1:
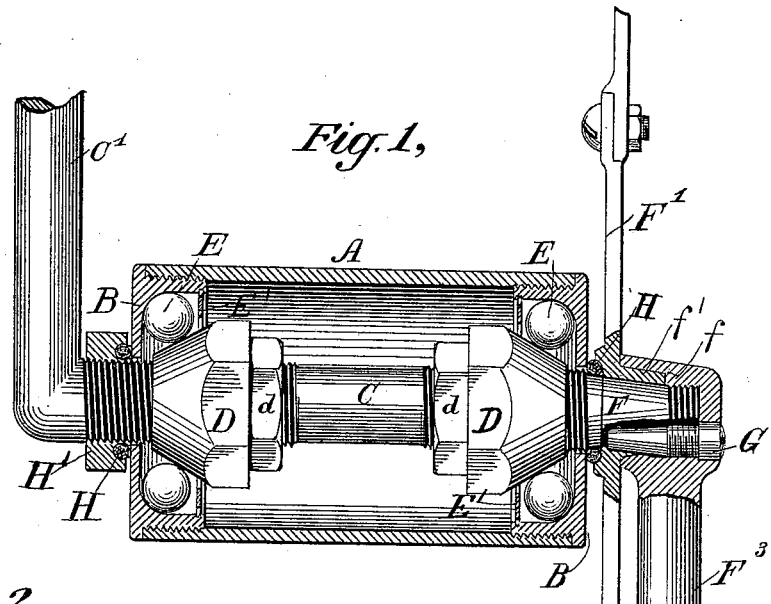
Figure 2:
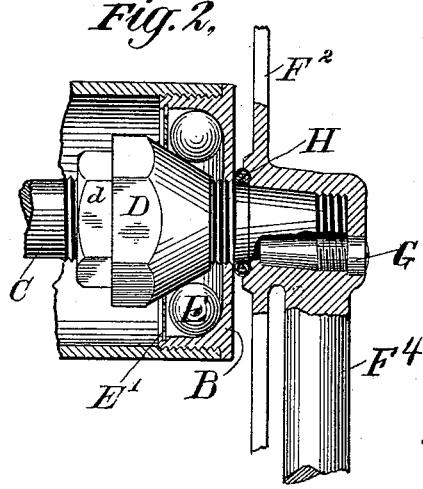
Figure 3:
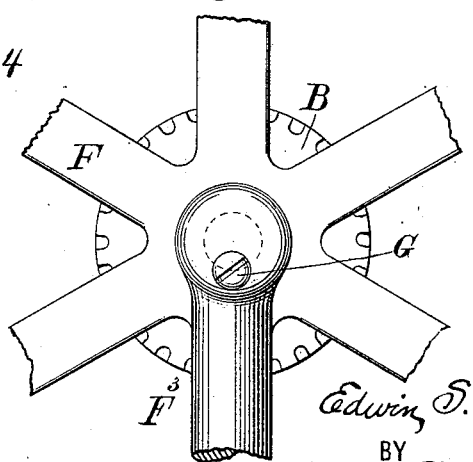

In the accompanying drawings, Figure 1 is a longitudinal section through a crank-axle bearing and its support, showing a crank and crank-axle embodying my improvement. Fig. 2 is a similar view of a modification, part being broken away. Fig. 3 is an end view of Fig. 1, parts, however, being removed.

Similar letters of reference designate corresponding parts in all the figures.

A designates the support for the crank-axle bearing, and it is here made tubular in form, constituting a reservoir for oil or other lubricant supplied to the bearing. The latter includes the ball-races B, made in the form of caps, which are removably engaged with the extremities of the support A, as shown.

C is the crank-axle, passing through suitable apertures in the caps B, and upon which there is adjustably mounted in juxtaposition to each race B a cone D. These cones, constituting one member of the bearing, of which the races B constitute the other, are engaged with the axle by screw-threads, and each is locked in position by a lock-nut $d$.

The balls E are held between the inclined surface of a cone D and the circular concave surface of its corresponding race B, the curvature of this latter surface, as seen in Fig. 1 or Fig. 2, being slightly greater than the curvature of the balls.

E' is a retaining-ring for holding the balls in position in each race when the latter is removed from its position. This ring may be fitted into position so that it may be readily removed, and is preferably notched at its outer edge to facilitate the passage of the lubricant to the balls.

C' designates one of the cranks, which may advantageously be made integral with the axle C. The opposite end of the axle to that from which the crank C' extends is tapering, as shown at F, and this tapering portion is threaded at its extremity and is embraced by the tapered hub of the driving sprocket-wheel F', Fig. 1, or $F^2$, Fig. 2. In the former figure the crank $F^3$ is made from a piece separate from that forming the sprocket-wheel F', the extremity of the crank being formed with a tapering socket $f$, threaded at the bottom. The hub $f'$ of the sprocket-wheel F' is tapering externally and is adapted to fit within the taper portion of the socket $f$, which may be forced down firmly upon it by screwing the crank $F^3$ home.

For the purpose of securing the parts to the axle C there is provided a threaded pin G, preferably tapering for a portion of its length, which is fitted to a correspondingly-formed opening located partly in the end portion of the axle C and also extending through the lateral wall of the socket $f$ and the hub $f'$. Intermediate of its ends the crank $F^3$ may also be connected to one of the spokes of the sprocket-wheel, as shown at $f^3$.

The construction shown in Fig. 2 is similar to that described with reference to Fig. 1, with the exception that in the former instance the sprocket-wheel $F^2$ and the crank $F^4$ are made integral with each other.

To prevent the oozing out of the lubricant through the annular space between the axle and the cap B, this space adjacent to the end of the axle from which the crank C' extends is encircled by an annular washer H, which is seated in an annular recess in a nut H', by means of which the washer may be forced snugly up against the face of the cap. At the other end of the axle the washer H is seated in a groove in the hub of the sprocket-wheel F' or $F^2$, between which and the face of the cap the washer is tightly held.

Having described my invention, what I consider as new, and desire to secure by Letters Patent, is—

The combination of a crank-axle provided at its extremity with a smooth tapering portion and an adjacent threaded portion, a crank having a recess or socket passing into it a short distance from one side, a portion of the length of the recess or socket being tapering to snugly fit the corresponding portion on the axle, the remainder being threaded to engage with the threaded portion of the axle, and a securing-pin formed with a tapering part terminating in a screw-threaded part, the pin fitting a recess located partially in the axle and partially in the side wall of the recess or socket in the crank, substantially as specified.

In testimony whereof I have signed my name to this specification in the presence of two subscribing witnesses.

EDWIN S. LEAYCRAFT.

Witnesses:
FREDERICK M. CZAKI,
PIERSON L. WELLS.